(12) United States Patent
Hummel et al.

(10) Patent No.: US 12,150,024 B2
(45) Date of Patent: Nov. 19, 2024

(54) METHOD FOR REPORTING DAZZLING CAUSED BY A HEADLIGHT SYSTEM OF AN ONCOMING VEHICLE AND FOR DETERMINING AN INCORRECT POSITION OF THE HEADLIGHT SYSTEM

(71) Applicant: Dr. Ing. h.c. F. Porsche Aktiengesellschaft, Stuttgart (DE)

(72) Inventors: Benjamin Hummel, Tamm (DE); Dominik Walter, Rutesheim (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 274 days.

(21) Appl. No.: 17/896,352

(22) Filed: Aug. 26, 2022

(65) Prior Publication Data

US 2023/0078108 A1   Mar. 16, 2023

(30) Foreign Application Priority Data

Sep. 16, 2021 (DE) ...................... 10 2021 123 976.1

(51) Int. Cl.
*H04W 4/46* (2018.01)
*B60Q 1/08* (2006.01)
*B60Q 1/14* (2006.01)

(52) U.S. Cl.
CPC .............. *H04W 4/46* (2018.02); *B60Q 1/085* (2013.01); *B60Q 1/143* (2013.01); *B60Q 2300/42* (2013.01); *B60Q 2300/47* (2013.01)

(58) Field of Classification Search
CPC .. H04W 4/46; B60Q 2300/42; B60Q 2300/47
See application file for complete search history.

(56) References Cited

U.S. PATENT DOCUMENTS

2021/0213873 A1* 7/2021 Martin ................... H04W 4/46

FOREIGN PATENT DOCUMENTS

| AT | 519976 A4 | 12/2018 |
|---|---|---|
| CN | 113386658 | 9/2021 |
| DE | 19948733 | 4/2001 |
| DE | 102012203214 A1 | 9/2013 |
| DE | 102013222628 | 5/2015 |

(Continued)

OTHER PUBLICATIONS

German Search Report dated May 31, 2022.
Korean Office Action dated Jan. 22, 2024.

*Primary Examiner* — Robert J May
(74) *Attorney, Agent, or Firm* — Gerald E. Hespos; Michael J Porco

(57) ABSTRACT

A method for reporting dazzling caused by a headlight system of a dazzling oncoming vehicle by means of a message produced by the dazzled vehicle that dazzling has been detected, wherein the message contains information relating to a position of the dazzled vehicle at the time of the detected dazzling. The method, also can proceed from the message, for determining an incorrect position of the headlight system of the dazzling vehicle by a comparison between a first intersection point between the trajectory of the oncoming dazzled vehicle and a light field produced by the headlight system of the dazzling vehicle, and a second intersection point between the trajectory of the oncoming dazzled vehicle and a model, stored in the vehicle system, of the light field generated by the headlight system of the dazzling vehicle.

10 Claims, 3 Drawing Sheets

(56) References Cited

FOREIGN PATENT DOCUMENTS

| | | |
|---|---|---|
| DE | 102015212425 A1 | 1/2017 |
| DE | 102018209779 | 12/2019 |
| EP | 2394851 | 12/2011 |
| JP | 2004291816 A | 10/2004 |

\* cited by examiner

METHOD FOR REPORTING DAZZLING CAUSED BY A HEADLIGHT SYSTEM OF AN ONCOMING VEHICLE AND FOR DETERMINING AN INCORRECT POSITION OF THE HEADLIGHT SYSTEM

CROSS REFERENCE TO RELATED APPLICATION

This application claims priority on German Patent Application No 10 2021 123 976.1 filed Sep. 16, 2021, the entire disclosure of which is incorporated herein by reference.

BACKGROUND

Field of the Invention

The invention relates to a method for reporting dazzling caused by a headlight system of an oncoming vehicle and a method for determining an incorrect position of the headlight system of the vehicle.

Related Art

Active headlights, known as LED matrix headlights, are mounted frequently in high-quality vehicles. An LED matrix headlight has an arrangement of LEDs arranged next to and on top of one another on a printed circuit board. The LED matrix headlights are referred to as active since their light emission can be adapted optimally to a current driving situation. The LED matrix of the headlights is controlled intelligently to carry out numerous functions that dynamically generate a light field and thereby significantly increase driving comfort and driving safety. A particularly prominent and elegant function is the possibility to mask segments of the light for oncoming traffic to avoid dazzling oncoming vehicles while simultaneously increasing the illumination of relevant parts of the roadway. Highly reflective traffic signs also can be recognized by a camera and selectively can be masked or irradiated with a lower intensity. The gaze of the driver is thus directed in a targeted manner and protected against overstimulation.

The number of individually controllable LEDs in LED matrix headlights currently is in the range of three digits and is increasing. Thus, it is possible to mask detected road users with ever greater precision to achieve better illumination of the driving environment. However, other road users still can be dazzled if mechanical changes within the headlight or the vehicle body occur. Such changes cause an incorrect position in comparison with an intended position. An incorrect position usually can be corrected only in a specialist workshop by means of a new light setting. Thus, the driving environment can no longer be illuminated optimally, and a decrease in driving safety is likely if the journey is continued.

Methods that address this problem are known from the prior art. For example, AT 519976 B1 discloses a method for operating a headlight of a motor vehicle to illuminate a region in front of the motor vehicle in the form of a defined light distribution. With this method, an oncoming motor vehicle is captured and this region of the light distribution is masked. The oncoming motor vehicle communicates with the dazzling motor vehicle by modulating its light field and as a result signals that dazzling is taking place.

DE 10 2012 203 214 A1 discloses a method and an apparatus for establishing dazzling of a driver of a motor vehicle. Dazzling is established using an optical light sensor and a warning signal is sent to the other motor vehicle if a predefined dazzle criterion has been met.

DE 10 2013 222 628 A1 discloses a method for capturing an incorrect position of a headlight of a motor vehicle. More particularly, light from an oncoming motor vehicle and its position is captured. It is also ascertained whether the captured light is a light flasher signal of the other vehicle and whether the other vehicle was located within the illuminated environment region of the headlights of the vehicle at the time of the light flasher signal. The light flasher signal indicates an incorrect position of the headlight, which is corrected on the basis of the light flasher signal.

The methods known from the prior art, however, have the disadvantage that in vehicles having only one sensor, e.g. a driver assistance camera, it is not possible to discern the direction of the incorrect position of the headlights. The only thing that can be detected is that dazzling has taken place, and, consequently, it is only the presence of an incorrect position of the headlights that can be stated in principle. Without any directional information regarding the incorrect position, the safety region or the masked region in the light field generated will be widened if such an incorrect position is present, but this widening must take place in both directions of the potentially dazzled vehicle, resulting in less than optimal illumination of the driving environment.

Starting from the problems mentioned initially and from the outlined prior art, an object of the present invention is to provide a method by which dazzling of other road users due to an incorrect position of the headlights of a dazzling vehicle can be detected and optimally can be eliminated.

SUMMARY

One aspect of this disclosure is based on the finding that it is possible to determine by means of a single sensor, such as the driver assistance camera (ADAS, also referred to below as vehicle camera), a direction by which the headlight system of a dazzling oncoming vehicle is misaligned. To this end, the dazzled vehicle can transmit information relating to the dazzle event to the other dazzling oncoming vehicle by means of Car2Car communication (also abbreviated to C2C communication). In the dazzling vehicle, the incorrect position of the headlights can be ascertained from the transmitted information and can be stored in the controller so as to be applied to any future dazzling suppression. Furthermore, the offset required to correct the incorrect position during the next headlight setting can be reset at the specialist workshop by a tester.

The headlights described herein are LED matrix headlights. It should also be noted that Car2Car communication can be referred to as vehicle-to-vehicle (V2V) communication and means direct communication between vehicles for the purpose of exchanging information and data with the aim of reporting critical and dangerous traffic situations to the driver at an early stage.

According to an aspect of this disclosure, a method for reporting dazzling caused by a headlight system of a dazzling oncoming vehicle is provided, and the method is carried out in the dazzled vehicle. In a first step, dazzling in the dazzled vehicle caused by the oncoming dazzling vehicle is detected by an optical sensor in the dazzled vehicle. The optical sensor can be a vehicle camera. Dazzling that is taking place is detected if the optical sensor either moves across a light-dark cut-off line or a dark-light cut-off line generated by the headlight system of the dazzling vehicle. In other words, the reference point for dazzling taking place can be set when the optical sensor enters the light field of the dazzling vehicle or when it exits the light field of the dazzling vehicle. Furthermore, it is possible to specify a minimum duration for which an illumination operation ascertained by the optical sensor must proceed to be classified as a dazzle event. It is thus possible to prevent illumination events from the environment that happen to correlate with the oncoming vehicle from erroneously being classified as dazzle events caused by the oncoming vehicle. The minimum duration can depend on the speed and can lie in the range from a few ten milliseconds to a few seconds.

The method further may comprise producing a message that dazzling has been detected. In some aspects, the message includes information relating to a position of the dazzled vehicle at the time of the detected dazzling. The position can be a vehicle position ascertained by means of GPS. The produced message can correspond to an internal message within the on-board system of the dazzled vehicle.

In a next step, the method includes sending the message by a wireless transmission module of the dazzled vehicle to the dazzling vehicle. The message sent can be a message within a data radio system that is designed for C2C communication and consequently operates on the basis of broadcast messages. These have the advantage that they can be sent and received in an infrastructure-less manner and are not directed only to one or more dedicated receivers, but can, in principle, be received by all subscribers in the local environment of the transmitter.

According to further aspects, the message can include an identifier of the dazzled vehicle. In this way, a dazzling vehicle receiving the message can derive, for example, information relating to the optical sensor of the dazzled vehicle and may ascertain in more detail the incorrect position of its headlights. This information can be in the message itself or retrieved by the vehicle receiving the message from a database.

According to further aspects of the method, the message can include information relating to the time of the detected dazzling. In this way, the reference point selected as the point at which dazzling is established can be provided with a time stamp that can be used by the dazzling vehicle receiving the message in the calculation of the incorrect position of its headlights to increase accuracy.

This disclosure also relates to a method carried out in a dazzling vehicle for determining an incorrect position of a headlight system of the dazzling vehicle. This method can proceed from the previously described method for reporting dazzling caused by a headlight system of a dazzling oncoming vehicle.

In a first step, the method for determining an incorrect position of the headlight system includes receiving a message from an oncoming vehicle by means of a wireless reception module of the dazzling vehicle that the oncoming vehicle has detected dazzling. In some aspects, the message contains information relating to a position of the dazzled vehicle at the time of the detected dazzling. The message can be the aforementioned message that has already been explained as part of the above-described method for reporting dazzling caused by a headlight system of a dazzling oncoming vehicle.

The method can include using a vehicle camera of the dazzling vehicle for determining a trajectory of the oncoming dazzled vehicle. The oncoming (dazzled) vehicle can be identified in the image of the vehicle camera, and its trajectory can be determined with respect to a reference point that was selected in accordance with convention (e.g. midpoint between the headlights, left or right headlight, midpoint at the upper periphery of the windscreen, etc.). The trajectory can be ascertained based on recordings by the vehicle camera that were recorded before the message was received and were stored in a buffer, preferably provided with a time stamp. Thus, ascertaining the trajectory need not be based only on image material recorded by the vehicle camera starting when the message from the dazzled vehicle is received. This is advantageous for accuracy and robustness of the computation algorithm in cases where the dazzled vehicle is not visible in places in the field of view of the vehicle camera from the time the message is received by the dazzling vehicle, for example because the dazzling vehicle is obscured by objects at the side of the road or by overtaking vehicles and consequently can be detected only with more difficulty or with a time delay.

The method further may include determining a first intersection point between the ascertained trajectory of the oncoming dazzled vehicle and a light field generated by the headlight system of the dazzling vehicle. For this purpose, the image material recorded by the vehicle camera is processed and evaluated for any intersection between the dazzled vehicle detected therein and the light field generated by the dazzling vehicle. The first intersection point here corresponds to the real intersection point between the trajectory of the oncoming vehicle and a segment boundary of the light field generated by the dazzling vehicle. The segment boundary of the light field can refer to a light-dark transition or a dark-light transition within the generated light field, in particular a transition between a part of the light field that has been masked by switching off the corresponding LEDs in the matrix and the remaining, active or light-filled part of the light field.

In a further step, the method may include ascertaining a second intersection point between the trajectory of the oncoming dazzled vehicle and a model, stored in the vehicle system, of the light field generated by the headlight system of the dazzling vehicle. The model of the light field generated by the headlight system of the dazzling vehicle can correspond to the light field actually generated at the time of the dazzling. To this end, the controller of the headlight system can have a memory in which the history of the control data of the headlights over a predefined time period (for example a few seconds to a few ten seconds) is stored. The second intersection point corresponds to the intended intersection point between the trajectory of the oncoming vehicle and the corresponding segment boundary of the light field generated by the dazzling vehicle in the case of a correctly set headlight.

In a further step, the method may include computing the incorrect position of the headlight system of the dazzling vehicle by comparing the first intersection point with the second intersection point. Based on the computed incorrect position, it is possible to ascertain an offset that must be applied when generating the light field so as to generate the generated light field and masked regions that are generated dynamically therein at their correct positions.

In summary, the second aspect of the method relates to the determining the direction of the incorrect position of the headlights by a single optical sensor. To this end, the dazzled vehicle sometimes sends the information as to when it was dazzled or no longer dazzled in terms of space and/or time to the dazzling vehicle. Based on this information, the dazzling vehicle can reconstruct the real location of the segment boundary in its light field and compare it with the intended location of the system boundary stored in the system. It should be noted that it is not only the direction, but also the misalignment amount that can be ascertained. On this basis, the dazzling vehicle can apply an offset derived from the ascertained misalignment amount to the dazzling suppression in a targeted manner and correct this light function in a targeted manner. There is no need to iteratively enlarge the masked region or safety region on both sides of the dazzled vehicle.

The position of the dazzled vehicle when the dazzling is detected thereby can correspond to the position at which the optical sensor moves across a light-dark cut-off line or a dark-light cut-off line generated by the headlight system of the dazzling vehicle. In other words, the method can use the segment boundary, located on the inside or outside with respect to the roadway, of the light field generated by the dazzling vehicle.

The method also can include correcting the light field generated by the headlight system on the basis of the computed incorrect position. This correction can include applying a corrected offset to the light field generated by the headlights.

The message used in the method can include information relating to the time of the dazzling detected by the dazzled vehicle. As noted herein, the reference point selected as the point at which dazzling is established, that is to say the passing of the optical sensor through the light-bark cut-off line or dark-light cut-off line of the light field, can be provided with a time stamp.

According to further aspect, the message can include an identifier of the dazzled vehicle. With respect to this feature, reference also is made to the previously described method for reporting dazzling caused by a headlight system of a dazzling oncoming vehicle.

A further aspect relates to a dazzle detection module for a vehicle. The dazzle detection module may be coupled to a wireless transmission and reception module and to a vehicle camera and is set up to carry out the previously described method for reporting dazzling and the method described above for determining an incorrect position of a headlight system. The dazzle detection module can be implemented within the on-board system of the vehicle or represent a separate computation module. Furthermore, the dazzle detection module can be coupled to the controller of the headlight system of the vehicle or to a function module connected upstream of the controller, so as to be able to transmit the ascertained offset to the controller. The dazzle detection module according to so aspects can carry out both the method on the part of the dazzled vehicle and also the method on the part of the dazzling vehicle, depending on the situation.

A further aspect relates to a method for determining an incorrect position of a headlight system of a dazzling vehicle on the basis of an inter-vehicle communication is provided, in which initially, as a first sub-method, the method for reporting dazzling caused by a headlight system of a dazzling oncoming vehicle is carried out and subsequently, proceeding therefrom, as a second sub-method, the method for determining an incorrect position of a headlight system of a dazzling vehicle is carried out. The first sub-method can here be used as a trigger mechanism for carrying out the second sub-method.

It is understood that the features mentioned above and the features yet to be discussed below may be used not only in the respectively specified combination but also in other combinations or individually without departing from the scope of the present invention.

Further advantages and configurations of the invention emerge from the entirety of the description and from the appended drawings.

DETAILED DESCRIPTION

FIGS. 1-4 schematically illustrate embodiments of the invention. The elements shown in the figures may be implemented in various forms of hardware, software or combinations thereof. Preferably, these elements are implemented in a combination of hardware and software on one or more appropriately programmed general-purpose devices that may include a processor, memory and input/output interfaces. The term "connected" as used herein is defined to mean directly connected to or indirectly connected with through one or more intermediate components. Such intermediate components may include both hardware and software-based components.

It will be appreciated by those skilled in the art that the block diagrams presented herein represent conceptual views of illustrative components embodying the principles of the disclosure. Similarly, any functions or methods implied by these block diagrams may be represented in computer readable media and so executed by a computer or processor, whether or not such computer or processor is explicitly shown.

Figure 1:
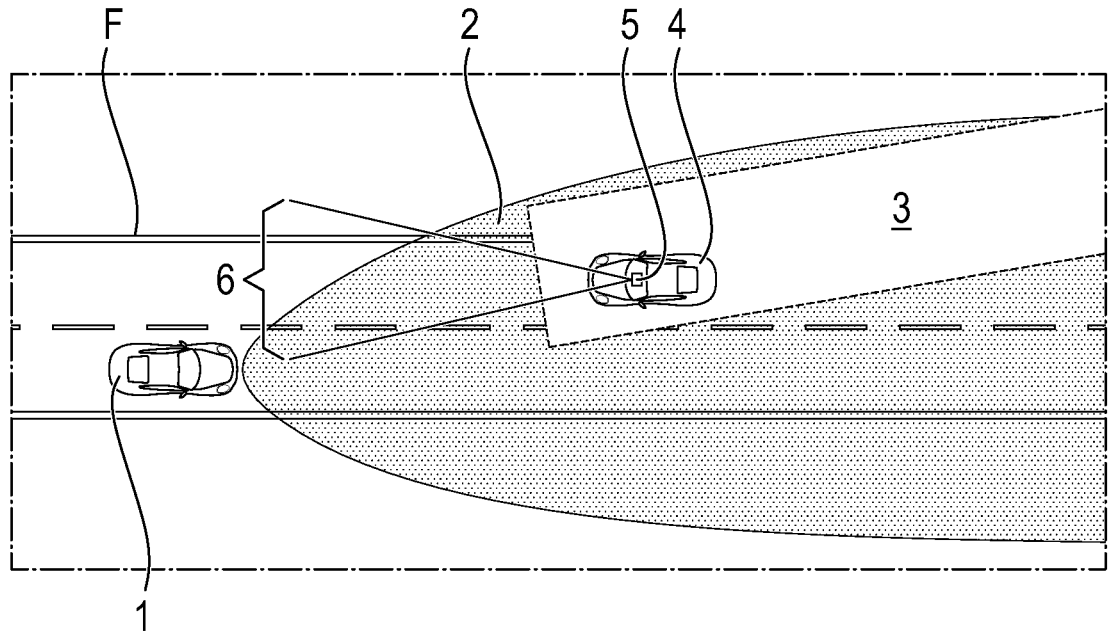
FIG. 1 illustrates a driving situation in which a light field of a first vehicle does not dazzle an oncoming vehicle.
Figure 2:
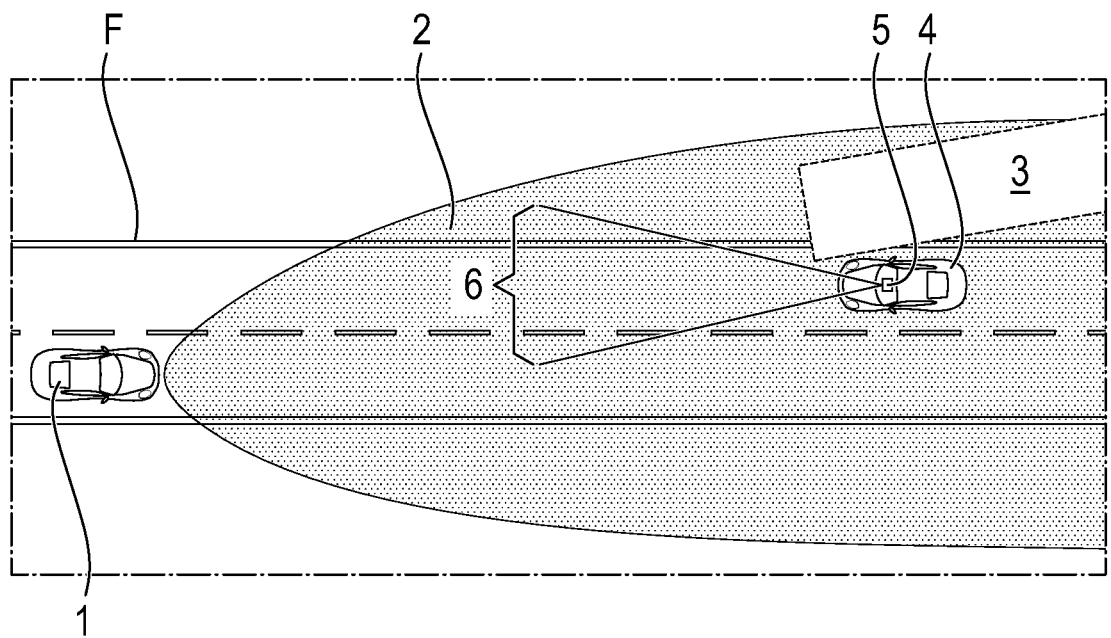
FIG. 2 illustrates a driving situation in which a light field of a first vehicle dazzles an oncoming vehicle.

FIGS. 1 and 2 each show a driving situation where a first vehicle 1 comes from the left on a roadway F and generates a first light field 2 by means of its headlights. The first vehicle 1 approaches a second vehicle 4 coming from the right. So as not to dazzle the second vehicle 4 coming from the right, the headlights of the first vehicle 1 are controlled such that a masked region 3 (also referred to as safety region) is not illuminated in the first light field 2. In other words, the second vehicle 4 detected by a vehicle camera of the first vehicle 1 is masked so that no light, at least no high beam, is emitted in the direction thereof. The second vehicle 4 also has a vehicle camera 5 that has a field of view 6 and can image the driving environment located therein. The second vehicle 4 and the vehicle camera 5 of the second vehicle 4 are located in the masked region 3, as shown in FIG. 1. Thus, the second vehicle 4 is not dazzled. To confirm that no dazzling is taking place, the second vehicle 4 can, upon detection of the first vehicle 1 by means of its vehicle camera 5, send a message on the basis of C2C communication, that it has not been dazzled. The vehicle camera 5 of some embodiments comprises optical RGB cameras, and/or action cameras, and/or LIDAR (Light detection and ranging) systems with optical distance and speed measurement, and/or stereoscopic optical camera systems, and/or ultrasonic systems, and/or radar systems, and/or infrared.

The driving situation has been modified in FIG. 2 so that, owing to an incorrect position of the headlights of the first vehicle 1, the masked region 3 of the light field 2 is not at its intended position and does not mask the second vehicle 4. Therefore, the light field 2 of the first vehicle 1 dazzles the driver of the second vehicle 4. The first vehicle 1 thus is the dazzling vehicle. In this driving situation, the vehicle camera 5 of the second vehicle 4 detects the dazzling event taking place, and according to an aspect of the invention, the second vehicle 2 can report the dazzling caused by the headlight system of the dazzling oncoming first vehicle 1.

Figure 3A:
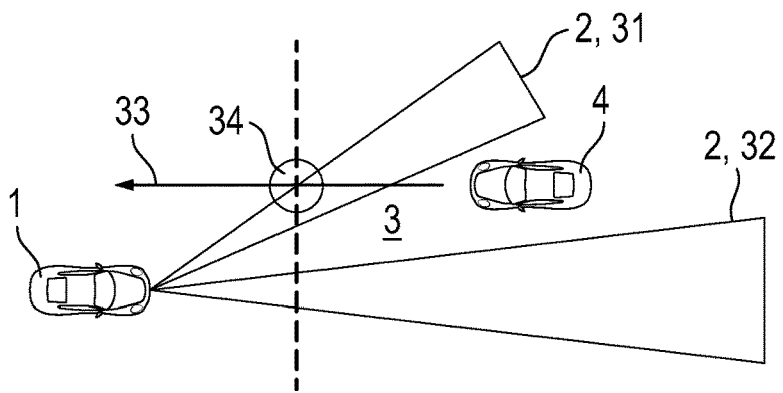
FIGS. 3A-3C are schematic views of the driving situation shown in FIGS. 1 and 2 with respect to the determination of the direction of the incorrect position of the headlight system of the dazzling vehicle.
Figure 3B:
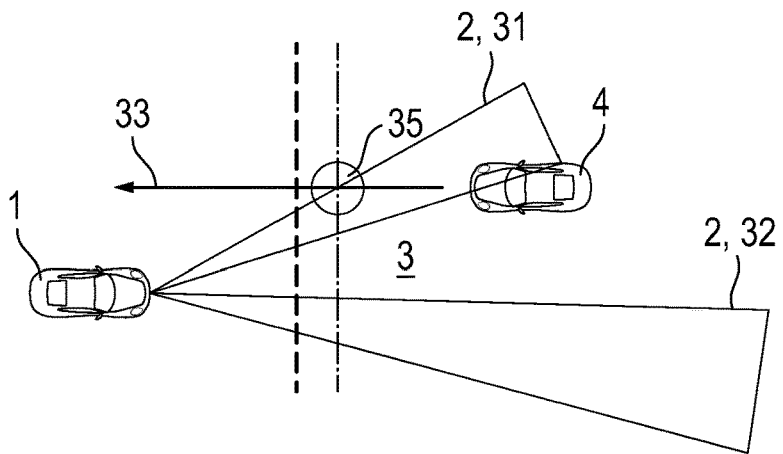
Figure 3C:
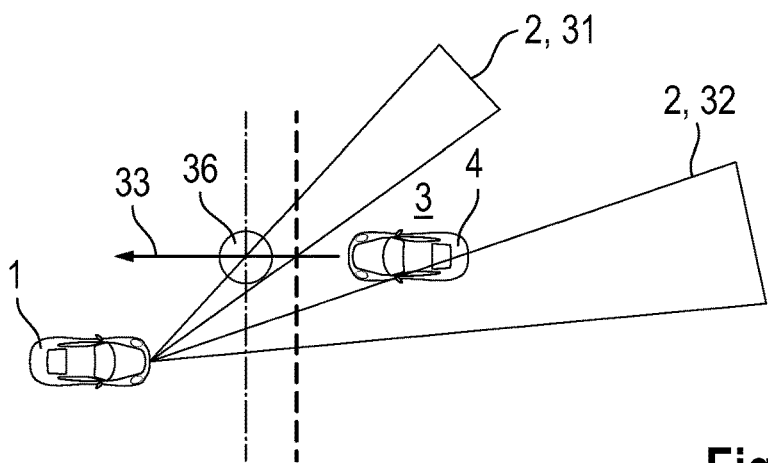

FIGS. 3A-3C are schematic views of the driving situation shown in FIGS. 1 and 2 with respect to the determination of the incorrect position of the headlight system of the dazzling first vehicle 1. The light field 2 generated by the first vehicle 1 has a first segment 31, a second segment 32 and a masked region 3 between the segments 31 and 32, by means of which the second vehicle 4 is intended to be masked. The arrow 33 indicates a trajectory of the second vehicle 4. For the purposes of simplification, a plan view of the driving scene shown in FIGS. 1 and 2 is depicted, rather than the perspective view of the driving scene from the view of the vehicle camera 5 of the second vehicle 4. The light-dark transition of a segment of the light field 2 will be considered below, but all statements can similarly be applied to the dark-light transition of the same segment.

FIG. 3A shows a scenario in which the headlight system of the first vehicle 1 is set correctly. The trajectory 33 has a first intersection point 34 with a segment boundary of the light field. In the present case, the segment boundary of the first segment 31 is located on the outside with respect to the roadway. In the case of a headlight of the first vehicle 1 that is set in this way, no dazzling of the second vehicle 4 takes place, and therefore the location of the first intersection point 34 in the image of the vehicle camera of the first vehicle 1 corresponds to an intended intersection point.

FIG. 3B shows a scenario in which the headlights are misaligned to the right, and therefore are aligned too far to the outer side of the roadway. Thus, the masked region 3 insufficiently masks the second vehicle 4 and therefore the second vehicle 4 is dazzled by the light field 2 of the first vehicle 1. The trajectory 33, which is reconstructed from the image data of the vehicle camera of the first vehicle 1, has a second intersection point 35 with the considered segment boundary of the light field 2 (the segment boundary of the first segment 31 located on the outside with respect to the roadway). The location of the second intersection point 35 has an offset with respect to the first intersection point 34. From this offset, the first vehicle 1 can ascertain the direction and also the misalignment amount and use both results for correcting the projected light field 2, in particular the location of the masked region 3 for masking the vehicle 2. The first vehicle 1 and the second vehicle 2 of some embodiments are provided with controllers, control units, modules and/or computers that can be used for carrying out the method described herein. In some embodiments, images recorded by the vehicle camera 5 are forwarded to an evaluation module. The evaluation module comprises an integrated or assigned processor and/or one or more storage units.

In the context of this disclosure, a "control unit" can be understood to include, for example, a processor and/or a storage unit or memory for storing algorithms and program commands. By way of example, a processor and/or control unit is specifically configured to carry out program commands in such a way that the processor and/or the control unit carries out functions to implement or realize a method as disclosed herein or a step of a method as disclosed herein. The term control unit is used here synonymously with devices known from the prior art. A control unit, therefore, encompasses a "computer" and accordingly comprises one or more general-purpose processors (CPUs) or microprocessors, RISC processors, GPUs and/or DSPs. A control unit or computer has for example additional elements such as storage interfaces of communication interfaces. Optionally or additionally, the terms "control unit" and "computer" refer to a device that is capable of executing a provided or included program, preferably with standardized programming language (for example C++, JavaScript or Python), and/or of controlling and/or accessing data storage devices and/or other devices such as input interfaces and output interfaces. The term computer also refers to a multiplicity of processors or a multiplicity of (sub)computers that are interconnected and/or connected and/or otherwise communicatively connected and possibly share one or more other resources, such as for example a memory.

In association with this disclosure, a "module" can be understood to mean, for example, a processor and/or a storage unit for storing program instructions. By way of example, the module may specifically be designed to execute the program instructions in such a way as to implement or realize the method described herein or a step of the method.

In association with this disclosure, a "processor" can be understood to mean, for example, a machine or an electronic circuit or a powerful computer. A processor can be in particular a central processing unit (CPU), a microprocessor or a microcontroller, for example an application-specific integrated circuit or a digital signal processor, possibly in combination with a storage unit for storing program instructions. Moreover, a processor can be understood to mean a virtualized processor, a virtual machine or a soft CPU. It can for example also be a programmable processor that is equipped with configuration steps for carrying out the stated method according to the invention or is configured with configuration steps in such a way that the programmable processor realizes the features according to the invention of the method, of the component, of the modules, or of other aspects and/or partial aspects of the invention. Moreover, highly parallel computing units and powerful modules can be provided. In addition, provision can be made for the processor not to be arranged in the vehicle 1 or 4, but rather to be integrated in a cloud computing infrastructure.

In association with this disclosure, a "storage unit" or "storage module" and the like can be understood to mean for example a volatile memory in the form of main memory (random-access memory, RAM) or a permanent memory such as a hard disk or a data carrier or e.g. an exchangeable storage module. However, the storage module can also be a cloud-based storage solution.

FIG. 3C shows the conjugate scenario shown in FIG. 3B, in which the headlight system is misaligned to the left, and therefore too far toward the middle of the roadway. As a result, the masked region 3 insufficiently masks the second vehicle 4, and the second vehicle 4 therefore is dazzled by the light field 2 of the first vehicle 1 (this time the second segment 32). The trajectory 33 is reconstructed from the image data of the vehicle camera of the first vehicle 1 and has a third intersection point 36 with the considered segment boundary of the light field 2 (the segment boundary of the first segment 31 located on the outside with respect to the roadway). The location of the third intersection point 36 has an offset with respect to the first intersection point 34. By analogy with the case of FIG. 3B, the first vehicle 1 can ascertain from this offset the direction and also the misalignment amount and use both results for correcting the projected light field 2, in particular the location of the masked region 3 for masking the vehicle 2.

Figure 4:
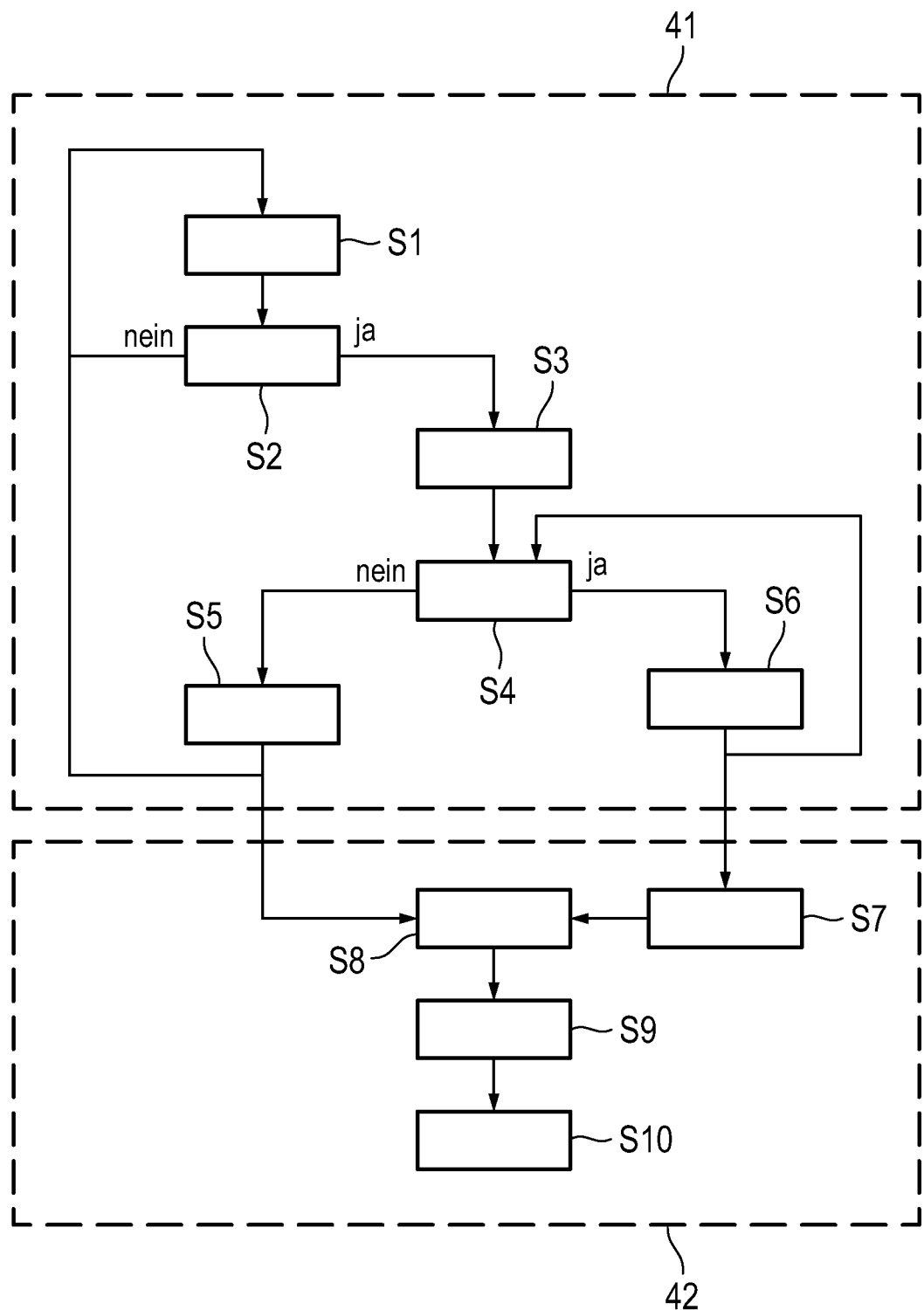
FIG. 4 is a flowchart which shows exemplary embodiments of the two methods according to the invention in an interconnected form.

FIG. 4 is a flowchart that shows exemplary embodiments of the two methods of the invention in an interconnected form. Here, the first region 41 illustrates an exemplary embodiment of the method for reporting dazzling caused by a headlight system of a dazzling oncoming vehicle (referred to as the first method below), while the second region 42 illustrates an exemplary embodiment of the method for determining an incorrect position of a headlight system of a dazzling vehicle (referred to as the second method below). With reference to the driving situations shown in the previous figures, the method steps from the first region 41 can be carried out in the second, potentially dazzled vehicle 4. Consequently, the method steps from the second region 42 can be carried out in the first, potentially dazzling vehicle 1.

In a first step S1, the first method is initialized. This is followed by the second step S2, in which a check is performed by means of a corresponding image processing algorithm on the basis of the image data from the vehicle camera as to whether an oncoming vehicle is detected. If this is not the case, the first method returns to the first step S1. This loop can be carried out continuously at predetermined time intervals. If an oncoming vehicle is detected, a unique identifier is assigned to the oncoming vehicle in a third step S3. Next, in a fourth step S4, a check is performed as to whether a dazzle event can be detected by the oncoming first vehicle 1. If this is not the case, a message is generated in a fifth step S5 to the effect that no dazzling is taking place. The message additionally includes the position of the second vehicle 4 and the identifier assigned to the oncoming vehicle 1, wherein the oncoming vehicle 1 indicates the recipient of the message. The message is sent by the radio communication module, after which the first method returns to the first step S1. In the case that a dazzle event is detected by the vehicle camera 5 of the second vehicle 4, a message is generated in a sixth step S6 that dazzling is taking place. The message also includes the position of the second vehicle 4 and the identifier assigned to the oncoming vehicle 1.

At this point, the first method transitions into the second method. Upon receiving the message produced by the second vehicle 4, the first vehicle 1 performs, in a seventh step S7, a determination of the trajectory of the oncoming vehicle, i.e. of the second vehicle 4. Subsequently, the ascertained trajectory is passed on for further processing within the system. In an eighth step S8, it is possible to check for safety purposes whether a message was not received from the supposedly dazzled vehicle that no dazzling is taking place. If no such message is present, in the eighth step S8 then dazzling is taking place. Consequently, in the subsequent ninth step S9, a comparison is performed between the real intersection point between the ascertained trajectory 33 of the dazzled second vehicle 4 and the light field 2, and the theoretical intended intersection point between the ascertained trajectory 33 of the dazzled second vehicle 4 and the location of the boundary of the corresponding segment of the light field 2 that is stored in the system of the first vehicle 1. These processes take place substantially as explained above on the basis of FIGS. 3A-3C. In a final step S10, a correction value for the location of the masked region 3 within the light field 2 is finally computed from the comparison of the locations of the real intersection point and the theoretical intended intersection point. This correction value can be applied to the dazzling suppression so as to obtain correct masking of the second vehicle.

What it claims is:

1. A method for reporting dazzling caused by a headlight system of a dazzling oncoming vehicle, comprising:
    detecting dazzling in a dazzled vehicle caused by the oncoming dazzling vehicle by means of an optical sensor in the dazzled vehicle, wherein the dazzling is detected when the optical sensor either moves across a light-dark cut-off line or a dark-light cut-off line produced by the headlight system of the dazzling vehicle;
    producing a message that dazzling has been detected, wherein the message includes information relating to a position of the dazzled vehicle at the time of the detected dazzling;
    sending the message by means of a wireless transmission module of the dazzled vehicle to the dazzling vehicle.

2. The method of claim 1, wherein the message contains an identifier of the dazzled vehicle.

3. The method claim 2, wherein the message contains information relating to a time of the detected dazzling.

4. A dazzle detection module for a vehicle that is coupled to a wireless transmission and reception module and to a vehicle camera and is set up to carry out the method of claim 1 for reporting dazzling.

5. A method for determining an incorrect position of a headlight system of a dazzling vehicle, including:
    receiving a message from an oncoming vehicle by means of a wireless reception module of the dazzling vehicle that the dazzled vehicle has detected dazzling, wherein the message contains information relating to a position of the dazzled vehicle at a time of the detected dazzling;
    determining a trajectory of the oncoming dazzled vehicle by means of a vehicle camera of the dazzling vehicle;
    determining a first intersection point between the trajectory of the oncoming dazzled vehicle and a light field generated by the headlight system of the dazzling vehicle;
    ascertaining a second intersection point between the trajectory of the oncoming dazzled vehicle and a model, stored in the vehicle system, of the light field generated by the headlight system of the dazzling vehicle; and
    computing an incorrect position of the headlight system of the dazzling vehicle by comparing the first intersection point with the second intersection point.

6. The method of claim 5, wherein the position of the dazzled vehicle at a time of the detected dazzling corresponds to the position at which the optical sensor moves across either a light-dark cut-off line or a dark-light cut-off line produced by the headlight system of the dazzling vehicle.

7. The method of claim 6, further comprising correcting the light field generated by the headlight system on the basis of the computed incorrect position.

8. The method of claim 6, wherein the message contains information relating to the time of the dazzling detected by the dazzled vehicle.

9. The method of claim 5, wherein the message contains an identifier of the dazzled vehicle.

10. A dazzle detection module for a vehicle that is coupled to a wireless transmission and reception module and to a vehicle camera and is set up to carry out the method of claim 5 for determining an incorrect position of a headlight system.

* * * * *